United States Patent Office 3,255,203
Patented June 7, 1966

3,255,203
1,3-DIPHENYL PYRAZOLINES
Erich Schinzel, Frankfurt am Main, and Karl Heinz Lebkücher, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 16, 1963, Ser. No. 273,291
Claims priority, application Germany, Apr. 21, 1962,
F 36,623
9 Claims. (Cl. 260—310)

It is already known that fluorescent 1,3-diaryl- or 1,3,5-triaryl-$\Delta_2$-pyrazoline compounds can be successfully used for the optical brightening of fiber materials, films and the like. Generally, these $\Delta_2$-pyrazoline compounds possess in addition to various other substituents at least one negative substituent in the phenyl radical bound to the nitrogen atom.

Now we were surprised to find that as optical brighteners there can be used more successfully the 1,3-diaryl-$\Delta_2$-pyrazoline compounds corresponding to the general formula

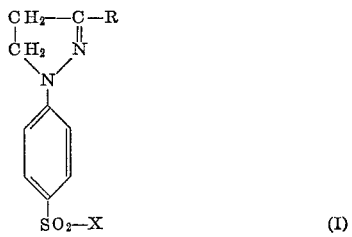

in which R represents an aryl radical which may be substituted, more particularly a phenyl radical, and X stands for the group —$CH_2$—$CH_2$—OH—, —CH=$CH_2$—, —$CH_2$—$CH_2$—$OSO_3$Me and especially for the group —$CH_2$—$CH_2$—$SO_3$Me, Me representing a cation. The group —$CH_2$—$CH_2$—$SO_3$Me has the advantage of imparting to the compounds a permanent solubility in water. It is suitable, however, to use as cation Me such ions which likewise promote the solubility in water. There are preferably used the ions of the alkali metals such as sodium or potassium and the ammonium ion. The substituents of the radical R shall be of such a condition that they do not change too much the absorption and emission maxima of the unsubstituted compound. As substituents halogen atoms, preferably chlorine or bromine, and also low molecular weight alkyl radicals such as methyl, ethyl, isopropyl or butyl, that is to say those which contain up to 4 or 5 carbon atoms are particularly suitable. The said substituents may be present several times in the phenyl nucleus, for example chlorine atoms in position 3 and 4. These compounds are distinguished by an excellent power of fluorescence when brightening fiber material, especially of polyamide, wool skin hairs (furs) and acetylated cellulose.

The $\Delta_2$-pyrazolines of the general Formula I used as brighteners in the present invention can be prepared in various manner, for example by reacting $\beta$-halogeno-alkylaryl ketones with hydrazinophenyl-$\beta$-hydroxyethylsulfones or hydrazinophenyl-$\beta$-sulfoethylsulfones. The $\Delta_2$-pyrazolines (Formula I: X=—$CH_2$—$CH_2$—OH) obtained with the hydrazinophenyl-$\beta$-hydroxyethylsulfones can be converted by reesterification with concentrated sulfuric acid into their sulfuric acid esters which then can be isolated in the form of their alkali metal salts.

The thus obtained neutral sulfuric acid esters (Formula I: X=—$CH_2$—$CH_2$—$OSO_3$Me) can be converted in an aqueous solution, if desired during the dyeing process, by the action of alkaline agents, into the very reactive vinylsulfonyl compounds (Formula I:

X=—$CH_2$=$CH_2$)

which in known manner are capable of adding hydrogen active compounds (for example alcohols, amines, mercaptanes).

When agents having an alkaline action are allowed to act on the said sulfuric acid esters in the presence of salts of the sulfurous acid, for example sodium sulfite and, occasionally at an elevated temperature, there are obtained also in this way the salts of the $\beta$-sulfoethylsulfonyl compounds (Formula I:

X=—$CH_2$—$CH_2$—$SO_3$Me)

As $\beta$-halogenoalkylaryl ketones there are mentioned: $\beta$-chloroethylphenyl ketone, $\beta$-chloroethyl-p-chlorophenyl ketone, $\beta$-chloroethyl-m, p-dichlorophenyl ketone, $\beta$-chloroethyl-p-bromophenyl ketone, $\beta$-chloroethyl-p-methylphenyl ketone and $\beta$-chloroethyl-p-methoxyphenyl ketone. As hydrazinophenyl-$\beta$-hydroxy- or -$\beta$-sulfoethylsulfones there may be used the 4-hydrazinophenyl-$\beta$-hydroxy-ethylsulfone or the 4-hydrazinophenyl-$\beta$-sulfoethylsulfone.

The proposed brighteners may be used in the usual manner. As far as the brighteners are soluble in water, they are suitably used in the form of an aqueous solution and as far as they are insoluble in water, they may be used in the form of aqueous dispersions, in a given case, with the help of dispersing agents. The amounts required for the brightening test vary within wide limits and can easily be determined by preliminary tests.

It is of particular advantage that the new brighteners can be used in the most different bleaching baths so that an additional working step is dropped. In combination with the usual detergents, the proposed brighteners yield also white effects. The compounds can be further used for shading white and coloured soaps.

Another field of application of these substances is their use in dyeing baths whereby there are obtained bright, brilliant dyeings which are particularly desired with pastel tints.

It is also easily possible to employ the said compounds in the most different finishing processes for example when sizing and softening. It is to be stressed that part of these substances can be used in the high quality finishing with some condensable resins without losing their brightening effect.

The following examples serve to illustrate the invention but they are not intended to limit it thereto, the parts being by weight unless otherwise stated.

*Example 1*

A polycaprolactam fabric was treated for 20 minutes at 60° C. with a solution containing 1% formic acid of 85% strength and
0.4% of the compound of the following constitution (II)

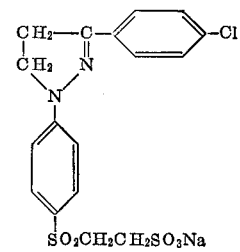

The fabric showed an excellent degree of white tint which could not be reached without the use of an optical brightener.

The determination of the degree of white effected with a Zeiss Elrepho apparatus gave a value of 81%, compared to magnesium oxide as the standard at a wave length of 460 mμ (unbrightened fabric: 71%).

The compound of the Formula II cited above was prepared in the following manner:

43.2 parts of 4-hydrazinophenyl-β-hydroxyethylsulfone and 40.8 parts of β-chloroethyl-p-chlorophenyl ketone were refluxed for 1 hour in 400 parts of volume of methanol to which 40 parts by volume of pyridine were added. The reaction mixture was then cooled to a temperature within the range of 0° C. and 5° C., the temperature was maintained for 2 hours and the crystallized 1-(4'-hydroxyethylsulfonylphenyl) - 3-(4''-chlorophenyl)-$\Delta^2$pyrazoline VII having a melting point of 222° C. was separated by suction-filtration. For reesterification, 25 parts of the dry $\Delta^2$-pyrazoline VII were introduced at room temperature into 150 parts of concentrated sulfuric acid and the whole was stirred for 15 hours. The solution was then poured onto 750 parts by volume of ice water, stirred for 1 hour in the cold, the precipitated acid, sulfuric acid ester was separated by suction-filtration and milled for several hours with a saturated methanolic potassium acetate solution in a ball mill. The potassium salt of the sulfuric acid ester was separated by suction-filtration, washed with ice water until it was free from sulfate ions and then dried at 60° C. under reduced pressure.

For preparing Compound II, 24.2 parts of the potassium salt of the sulfuric acid ester were boiled for 150 minutes under reflux in 350 parts of volume of water with 25.2 parts of crystallized sodium sulfite until a specimen after addition of dilute sodium hydroxide solution did no longer show a precipitation. Little impurities were then separated by suction-filtration, the clear solution was mixed with 37.5 parts of sodium chloride and the Compound II was isolated after cooling of the solution. The product was then washed with a sodium chloride solution of 10% strength until it was free from sulfate ions and dried at 60° C. under reduced pressure.

*Example 2*

Into a liquid mild detergent of the following composition:

| | Percent |
|---|---|
| Alkylarylsulfonate | 10 |
| Sodium salt of oleylmethyltauride | 4 |
| Para-toluenesulfonate | 6 |
| Potassium pyrophosphate | 12 |
| Water | 67.7 |

0.3% of the optical brightener having the following composition (III)

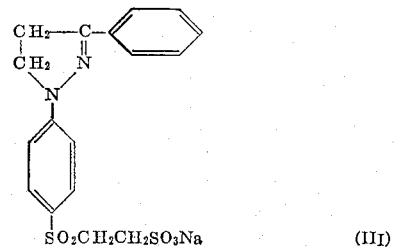

was incorporated.

Knitted fabrics of polycaprolactam showed already after a single treatment for 15 minutes at 50° C. and a goods-to-liquor ratio of 1:30 with 5 grams of the above detergent per liter of bath a brilliant brightening. Even after several washes, the material showed no signs of brightener accumulations.

The compound was also very active when brightening fur hairs. The compound of Formula II was prepared in the manner described in Example 1 with the use of β-chloroethylphenyl ketone.

*Example 3*

A woolen flannel was bleached for 3 hours at 45° C. with a solution containing

| | Percent |
|---|---|
| Hydrogen peroxide of 35% strength | 40 |
| Sodium pyrophosphate | 4 |
| Ammonia of 25 % strength | 2 |

After acidification with 2% of acetic acid of 100% strength for 15 minutes in the cold, the material was bleached for 90 minutes at 50° C. in a reducing solution containing per liter.

4% sodium dithionite and
0.4% compound of Formula II, and then acidified again.

The woolen fabric thus treated showed a brilliant white. The degree of white tint was improved from 69% (unbrightened fabric) to 78%.

*Example 4*

A bleached taffeta of polycaprolactam was finished with a polyvinylacetate dispersion of 20% strength containing 0.1% of Compound III.

The material was then squeezed to a 50% liquor absorption and dried. In addition to the desired finishing effect the fabric possessed a beautiful white.

*Example 5*

A bleached woolen yarn was dyed with a solution containing 0.1% of the dyestuff of the formula

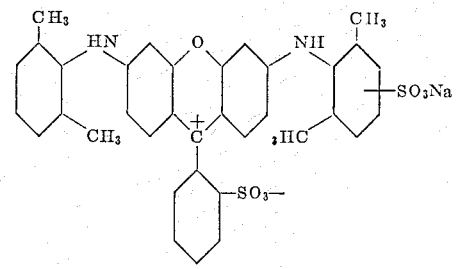

2% of acetic acid of 100% strength
5% of Glauber's salt
5% of ammonium acetate and
1% of Compound (IV) of the formula

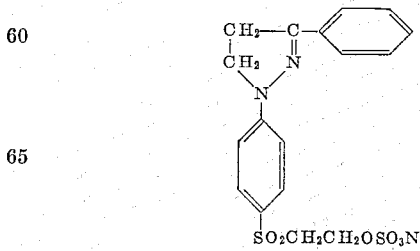

This treatment yielded a very bright tint which could not be reached without the use of optical brighteners.

The Compound IV was prepared in the manner described in Example 1 with the use of β-chloroethylphenyl ketone and neutralisation of the sulfuric acid ester with sodium bicarbonate.

Example 6

For obtaining a high quality finishing, a bleached polycaprolactam taffeta was impregnated with a dimethyloldihydroxy-ethylene urea and magnesium chloride as catalyst. 1.5 grams of Compound (V) of the formula

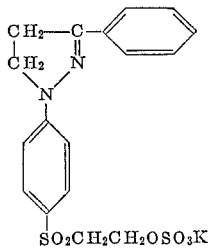

SO$_2$CH$_2$CH$_2$OSO$_3$K    (V)

were added per liter of impregnating bath.

The material was then squeezed to a 50% liquor absorption and condensed for 5 minutes at 150° C.

By this treatment, the degree of white was improved from 71% (crude material) to 76%.

The Compound (V) was prepared as described in Example 1 by using the β-chloroethylphenyl ketone and neutralisation of the sulfuric acid ester with a methanolic potassium acetate solution.

Example 7

For obtaining a smooth, soft handle, a knitted fabric of polycaprolactam was treated for 20 minutes at 60° C. in a winch vat with a solution containing 2% of a mixture of fatty acid sarcosides, 0.4% (calculated on the weight of the goods) of an aqueous dispersion of the following Compound (VI)

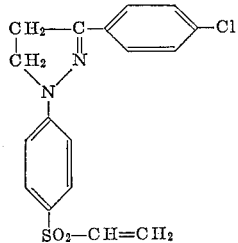

SO$_2$—CH=CH$_2$    (VI)

having been added to the bath.

The degree of white was thereby improved from 71.3% (crude fabric) to 80.9% and a pleasant, smooth handle was obtained.

For preparing the vinylsulfonyl Compound (VI), 9.7 parts of the potassium salt of the sulfuric acid ester indicated in Example 1 were dissolved at 80° C. in 200 parts by volume of water, the solution was allowed to cool down to 20° C. and then rendered alkaline to triazene paper (pH about 10–11) by dropwise adding about 25 parts by volume of a 2 N-sodium hydroxide solution. The solution was then stirred for 60 minutes at 20° C., the precipitated vinylsulfonyl compound was separated by suction-filtration, washed with water until neutrality was reached and dried at 60° C. under reduced pressure. After a single recrystallisation from butanol, the vinylsulfonyl Compound (VI) possessed a melting point of 192° C.

Example 8

An untreated knitted fabric of polycaprolactam was bleached for 60 minutes at a temperature within the range of 80° C. and 85° C., at a goods-to-liquor ratio of 1:20, in a bath containing per liter 0.5 gram sodium chlorite of 100% strength,
0.2 cc. acetic acid of 100% strength and
0.2 gram of an aqueous dispersion of the following Compound (VII)

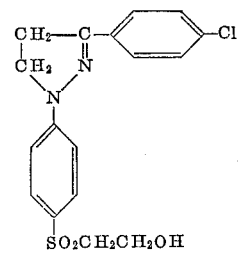

SO$_2$CH$_2$CH$_2$OH    (VII)

This bath was adjusted to pH 3.5 with concentrated sulfuric acid. After this treatment, the material exhibited a brilliant bluish white which could not be reached without the use of an optical brightener. The compound (VII) was prepared as described in Example 1.

Example 9

A woolen flannel was bleached for 180 minutes at a temperature within the range of 45° C. and 50° C. with an aqueous dispersion containing 30% hydrogen peroxide of 35% strength
3% sodium pyrophosphate
2% ammonia of 25% strength and
0.4% of the compound of Formula VIII

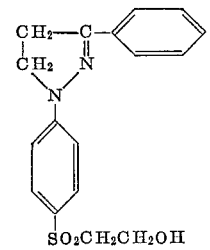

SO$_2$CH$_2$CH$_2$OH    (VIII)

and then rinsed hot and cold.

The fabric thus treated showed a pure white and a brilliant brightening.

Compound (VIII) was prepared in the manner described in Example 1 with the use of the β-chloroethylphenyl ketone.

Example 10

Chrome-tanned lambskins were treated for 30 minutes at 35° C. in the winch vat, at a goods-to-liquor ratio of 1:30, calculated on the weight of the dry skins, in a bath containing per liter 1 gram of a product obtained by the reaction of 1 mole of nonylphenol or tributylphenol with about 14–16 moles of ethylene oxide. The material was then moved for 30–60 minutes at 50° C. in the winch vat in a fresh bath containing per liter 4 grams of sodium dithionite (Na$_2$S$_2$O$_4$) and 0.05–0.5 gram of the optical brightener of the Formula III. The material was then rinsed in a fresh bath, centrifuged and the skins were then subjected to the usual finishing operation.

What we claim is:

1. 1,3-diaryl-Δ$_2$-pyrazoline of the formula

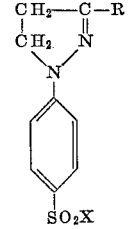

SO$_2$X in which R represents phenyl, halophenyl or lower alkyl phenyl, X stands for —CH=CH$_2$ or —CH$_2$CH$_2$SO$_3$Me, and Me represents sodium, potassium or ammonium.

2. 1,3-diaryl-Δ₂-pyrazoline of the formula

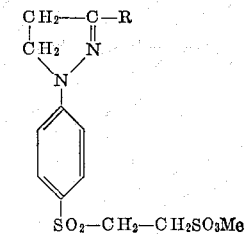

in which R stands for a phenyl radical, and Me represents sodium, potassium or ammonium.

3. Compound of the formula

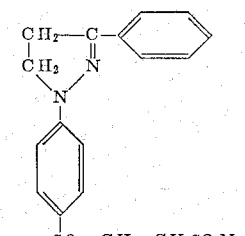

4. Compound of the formula

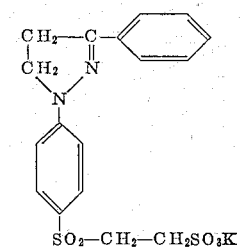

5. Compound of the formula

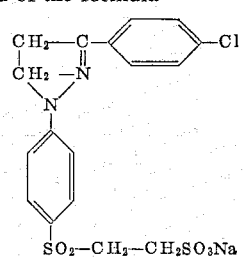

6. Compound of the formula

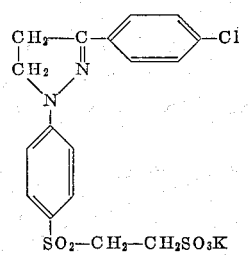

7. The compound of the formula

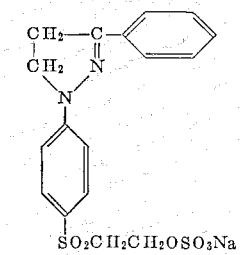

8. The compound of the formula

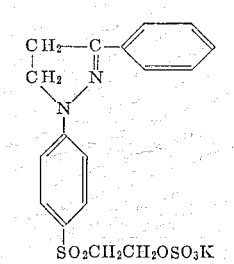

9. The compound of the formula

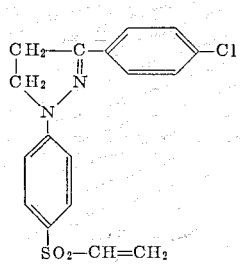

References Cited by the Examiner

UNITED STATES PATENTS

| | | | |
|---|---|---|---|
| 2,610,969 | 9/1952 | Kendall et al. | 260—310 |
| 2,702,759 | 2/1955 | Scalera et al. | 117—33.5 |
| 2,873,206 | 2/1959 | Geigy et al. | 117—33.5 |
| 2,897,206 | 7/1959 | Fukui et al. | 260—310 |
| 2,976,295 | 3/1961 | Plue | 260—310 |
| 2,985,593 | 5/1961 | Broderick et al. | 260—310 |
| 3,013,015 | 12/1961 | Plue | 260—310 |
| 3,133,080 | 5/1964 | Sarkar et al. | 260—310 |

FOREIGN PATENTS 1,304,610   8/1962   France.

JOHN D. RANDOLPH, *Acting Primary Examiner.*

NICHOLAS S. RIZZO, WALTER A. MODANCE,
*Examiners.*

NATALIE TROUSOF, *Assistant Examiner.*